United States Patent
Wilkening et al.

(10) Patent No.: US 7,029,776 B2
(45) Date of Patent: Apr. 18, 2006

(54) METHOD FOR IMPROVING A HEAT AND MASS TRANSPORT IN A DIFFUSION LAYER OF A FUEL CELL, AND CORRESPONDING FUEL CELL

(75) Inventors: Heinz Wilkening, Wunstorf (DE); Jörg Huslage, Burgdorf (DE); Frank Heser, Isenbüttel (DE)

(73) Assignee: Volkswagon AG, Wolfsburg (DE)

( * ) Notice: Subject to any disclaimer, the term of this patent is extended or adjusted under 35 U.S.C. 154(b) by 277 days.

(21) Appl. No.: 10/358,952

(22) Filed: Feb. 4, 2003

(65) Prior Publication Data

US 2003/0148150 A1    Aug. 7, 2003

(30) Foreign Application Priority Data

Feb. 5, 2002    (DE) ................. 102 04 598

(51) Int. Cl.
 *H01M 8/04*    (2006.01)
 *H01M 8/00*    (2006.01)
 *H01M 2/14*    (2006.01)
 *H01M 2/00*    (2006.01)

(52) U.S. Cl. .................. 429/13; 429/26; 429/44; 429/38; 429/34; 429/39; 429/25

(58) Field of Classification Search .............. 429/13, 429/26, 44, 38, 34, 39
See application file for complete search history.

(56) References Cited

U.S. PATENT DOCUMENTS

| | | | |
|---|---|---|---|
| 6,420,061 B1 * | 7/2002 | Fujii et al. | 429/26 |
| 2001/0005557 A1 | 6/2001 | Yosida et al. | |
| 2003/0059662 A1 * | 3/2003 | Debe et al. | 429/34 |

FOREIGN PATENT DOCUMENTS

| | | | |
|---|---|---|---|
| DE | 100 08 022 A1 | | 8/2000 |
| DE | 101 10 819 A1 | | 10/2002 |
| DE | 10110819 | * | 10/2002 |
| EP | 0 231 576 B1 | | 11/1990 |
| EP | 1 109 241 A2 | | 6/2001 |
| EP | 1 231 657 A1 | | 8/2002 |

* cited by examiner

*Primary Examiner*—Patrick Joseph Ryan
*Assistant Examiner*—Angela J. Martin
(74) *Attorney, Agent, or Firm*—Laurence A. Greenberg; Werner H. Stemer; Ralph E. Locher (57) ABSTRACT

A method for improving a heat and mass transport in a diffusion layer of a fuel cell is provided. The diffusion layer is connected to a bipolar element which has a plurality of channels for carrying an operating medium. A pressure difference is generated in at least two adjacent channels for carrying the operating medium in order to achieve a convective heat and mass transport. A fuel cell having an improved heat and mass transport in a diffusion layer is also provided.

19 Claims, 5 Drawing Sheets

METHOD FOR IMPROVING A HEAT AND MASS TRANSPORT IN A DIFFUSION LAYER OF A FUEL CELL, AND CORRESPONDING FUEL CELL

BACKGROUND OF THE INVENTION

Field of the Invention

The invention relates to a method for improving a heat and mass transport in a diffusion layer of a fuel cell. The diffusion layer is connected to a bipolar element which has a plurality of channels for carrying an operating medium. The invention furthermore relates to a fuel cell having an improved heat and mass transport in its diffusion layer.

Fuel cells having a diffusion layer and methods of operating such fuel cells are generally known. The operating principle of a fuel cell is based on the principle that in an electro-chemical reaction reactants such as hydrogen and oxygen react to form products such as water. The electro-chemical reaction produces a potential difference and an electric current, so that electrical energy can be generated directly by the fuel cell.

A fuel cell includes two catalytic reaction layers which are spaced apart from one another and have a membrane disposed between them. In this case, an anode reaction takes place in one reaction layer and a cathode reaction takes place in the other reaction layer. The membrane ensures a desired transport of charge carriers, for example of protons ($H^+$). Both catalytic reaction layers are operatively connected to in each case one porous diffusion layer, in such a manner that reactants, such as $H_2$ and/or $O_2$, and reaction products, such as $H_2O$, of the electro-chemical reaction as well as electrons $e^-$ are fed to or removed from the corresponding catalytic reaction layer. In the porous diffusion layer, gas is transported through the pores thereof, while at the same time electrons are transported through the electrically conductive structure of the same diffusion layer. The porous diffusion layer is connected to a bipolar plate (bipolar element), which on its contact side is provided with channels for carrying an operating medium (flow channels), which are open at the edges, and webs correspondingly disposed between the channels.

The flow channels in the bipolar plate are used to transport, i.e. remove or supply, gaseous reactants, i.e. the starting material or operating medium, and reaction products, while the webs are used in a corresponding manner to supply and remove electrons. In conventional fuel cells, a predominantly diffusive heat and mass transport is established in the diffusion layer. The upper power range of a fuel cell (high current density) is limited by the mass transport of reactants/reaction products through the diffusion layer to/from the catalytic reaction layer (electrode) and by the transport of waste heat from the reaction layer through the diffusion layer. In principle, it is desirable to have a heat and mass transport between the porous diffusion layer and the adjoining catalytic reaction layer that is as uniform as possible, in order to achieve a correspondingly uniform reaction density or current density in the same catalytic reaction layer. Conventional fuel cells cannot ensure a heat and mass transport from the porous diffusion layer to the catalytic reaction layer that is sufficiently uniform for this purpose.

SUMMARY OF THE INVENTION

It is accordingly an object of the invention to provide a method for improving a heat and mass transport and a corresponding fuel cell configuration which overcome the above-mentioned disadvantages of the heretofore-known methods and configurations of this general type and which provide an improved heat and mass transport in a diffusion layer of a fuel cell.

With the foregoing and other objects in view there is provided, in accordance with the invention, a method for improving a heat and mass transport in a diffusion layer of a fuel cell, the method includes the steps of:

providing a bipolar element including a plurality of channels for carrying an operating medium;

providing a diffusion layer operatively connected with the bipolar element; and generating a convective heat and mass transport in the diffusion layer by generating a pressure difference between two adjacent ones of the channels.

In other words, a method for improving a heat and mass transport in a diffusion layer of a fuel cell, the diffusion layer being connected to a bipolar element which includes a plurality of channels for carrying an operating medium, is characterized in that a pressure difference is generated in at least two adjacent channels for carrying operating medium, so as to form a convective heat and mass transport.

In order to achieve the object of the invention, it is proposed that a pressure difference is generated in at least two adjacent channels for carrying an operating medium, so as to form a convective heat and mass transport. In this context, a distinction needs to be drawn between a diffusive and a convective heat and mass transport. A diffusive transport is established on account of the existence of a concentration gradient or a temperature gradient, while a convective transport is attributable to the presence of a pressure gradient. Therefore, in the method according to the invention, both a diffusive heat and mass transport and a corresponding convective heat and mass transport are produced, since there is a sufficiently great pressure gradient (pressure difference) between at least two adjacent channels for carrying an operating medium. A pure diffusive heat and mass transport as in the prior art would lead to an uneven reaction density or current density in the catalytic reaction layer of the fuel cell, on account of a corresponding lack of uniformity in the heat and mass transport in the same catalytic reaction layer. A reaction density and/or current density which is more uniform compared to the prior art can be achieved in the catalytic reaction layer by the convective heat and mass transport which is additionally established in accordance with the invention. In this context, the term "adjacent channels" for carrying an operating medium can also be understood as meaning corresponding channel sections that are adjacent to one another.

The operating medium advantageously includes gaseous reaction products and gaseous reactants or reaction starting materials. The reaction products may be water ($H_2O$) and the reaction starting materials or reactants may be hydrogen and oxygen ($H_2$, $O_2$), which are each carried through the channels for carrying an operating medium in the gaseous state. Accordingly, hydrogen and oxygen are transported as reactants in the diffusion layer.

The substances which are to be transported in the diffusion layer are preferably reactants, in particular $H_2$ and $O_2$, reaction products, in particular $H_2O$, and electrons. The use of these substances in a fuel cell is already known. These substances are transported from the diffusion layer to a catalytic reaction layer of the fuel cell.

According to another mode of the invention, the gaseous reactants are supplied as pure reactants or as part of a mixture.

The bipolar element is preferably configured as a surface-structured bipolar plate with, on one surface, channels for carrying an operating medium, which are open at the edges, and webs disposed between them. The channels for carrying the operating medium are used to supply and remove the gaseous reactants and reaction products, while electrons are correspondingly supplied and removed via the webs. Gaseous reaction products and reaction starting materials, and also electrons, pass into the diffusion layer. In other words, the surface-structured bipolar plate has a surface formed with webs between the channels, which are open at the surface of the bipolar plate.

According to a preferred mode of the invention, the pressure difference is generated in each case in two adjacent channels for carrying the operating medium and, at the same time, the pressure drop between an operating-medium inlet and an operating-medium outlet of the fuel cell is minimized. A high pressure drop in the fuel cell is to be avoided, since a high pressure drop is associated with correspondingly high power losses for example in compressors which in turn results in a low overall efficiency. Therefore, a pressure difference between two adjacent channels for carrying an operating medium is particularly desirable, however, at the same time, a low pressure drop with regard to the fuel cell as a whole should be provided.

The pressure difference is advantageously generated in adjacent channels for carrying an operating medium, which extend continuously from the operating-medium inlet to the operating-medium outlet of the fuel cell. The pressure drop in the fuel cell is effectively minimized by providing the channels as continuous, i.e. uninterrupted channels for carrying an operating medium, while at the same time it becomes possible to generate a desired pressure difference in respective two adjacent channels for carrying the operating medium.

A system of channels, which includes the channels for carrying an operating medium, advantageously extends from the operating-medium inlet to the operating-medium outlet of the fuel cell substantially in the form of a single meander, a multiple meander, a double spiral or another flow array which produces adjacent channel sections. Therefore, there is a wide range of possible options with regard to the ways in which the channels for carrying an operating medium run within the bipolar element in order to produce a desired pressure gradient between two adjacent channels for carrying an operating medium.

According to a preferred mode of the invention, the system of channels includes two or more than two channels for carrying an operating medium. One of the two channels for carrying an operating medium executes, downstream of the operating-medium inlet, an additional loop, then extends, in the direction of flow as far as the operating-medium outlet, substantially parallel to the other channel for carrying an operating medium, in particular so as to form a single or multiple meander. The other channel for carrying an operating medium executes an additional loop upstream of the operating-medium outlet. The two loops have in particular the same length and have a matching shape. The desired pressure difference between two adjacent channels for carrying an operating medium is generated by the additional loops as a result of the distance along the channel that is covered from the operating-medium inlet to a certain point in two adjacent channels for carrying an operating medium wherein the covered distance differs on account of the first loop which has to be flowed through in one of the two channels for carrying an operating medium. The pressure difference is reduced or eliminated before the operating-medium outlet is reached as a result of the other channel for carrying an operating medium having the second loop at the end of the through-flow.

With the objects of the invention in view there is also provided, a fuel cell configuration, including:

a diffusion layer;

a bipolar element adjacent the diffusion layer, the bipolar element having a plurality of channels formed therein for carrying an operating medium; and the channels being configured to provide a pressure difference between respective two adjacent ones of the channels.

In other words, the fuel cell according to the invention is distinguished by the fact that the fuel cell is configured to generate a pressure difference in at least two adjacent channels for carrying an operating medium in a bipolar element. The advantages described above with respect to the method according to the invention can be achieved by a fuel cell of this type.

The fuel cell may be part of a fuel cell system used for stationary or mobile applications. The fuel cell may in particular be part of a fuel cell system in a motor vehicle.

Other features which are considered as characteristic for the invention are set forth in the appended claims.

Although the invention is illustrated and described herein as embodied in a method for improving a heat and mass transport in a diffusion layer of a fuel cell, and a corresponding fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
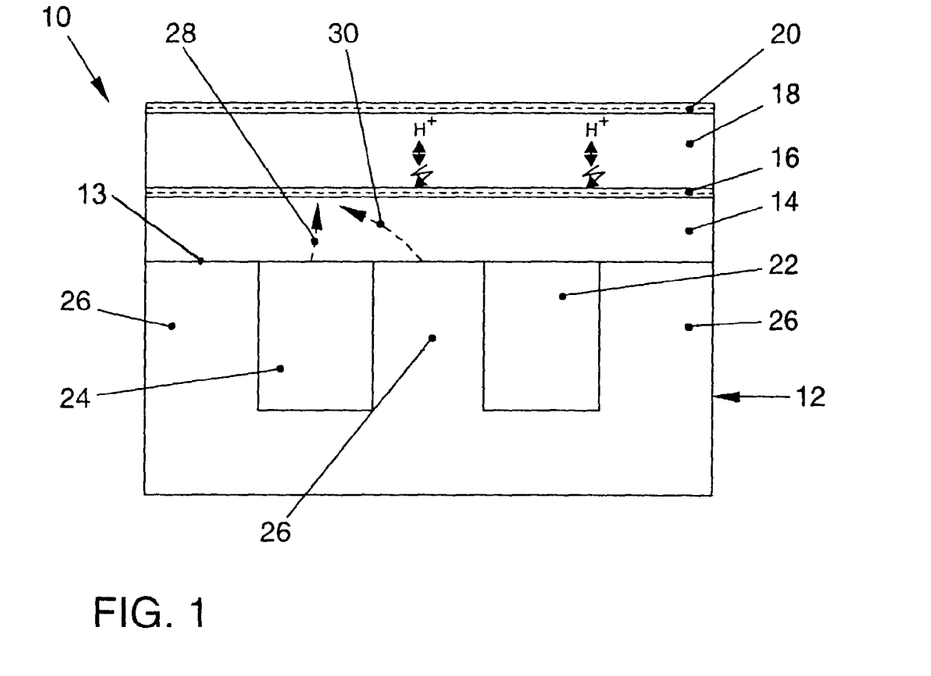
FIG. 1 is a diagrammatic cross-sectional view of a part of a fuel cell according to the invention.

Referring now to the figures of the drawings in detail and first, particularly, to FIG. 1 thereof, there is diagrammatically shown a part of a fuel cell, which is denoted overall by reference numeral 10. Such a fuel cell can be used, for example, in a motor vehicle. The fuel cell 10 includes a bipolar plate 12, which is only illustrated from one side and which is in bearing contact at its surface 13 with a porous diffusion layer 14. The diffusion layer 14 and a first catalytic reaction layer 16 are connected to one another at a respective surface thereof. The first catalytic reaction layer 16 for its part is operatively connected to a second catalytic reaction layer 20, with a membrane 18 between them. The way in which the fuel cell 10 functions is known per se, and consequently only the factors which are relevant to the invention will be dealt with in detail.

The bipolar plate 12 is provided with channels 22, 24 for carrying an operating medium. The channels for carrying an operating medium are open at the edges with respect to the surface 13 and are simply referred to as channels in the following description. The bipolar plate 12 has the channels 22, 24 formed therein so as to form webs 26 which extend between and/or next to the channels 22, 24. The channels 22, 24 are used to supply and remove gaseous reaction products (water) and gaseous reactants or reaction starting materials (hydrogen and oxygen), while the webs 26 supply and remove electrons in a corresponding way. A possible mass transport path from the channel 24 through the porous diffusion layer 14 to the first catalytic reaction layer 16 is illustrated by a dashed arrow 28 in FIG. 1, while a further dashed arrow 30 shows a corresponding mass transport path from one of the webs 26 through the diffusion layer 14 to the first catalytic reaction layer 16. On account of the longer mass transport path indicated by arrows 30 compared to arrow 28, the mass transport to the first catalytic reaction layer 16 may, undesirably, be unevenly distributed. This may occur in particular if the channels 22, 24 are at a substantially identical pressure level, so as to form a purely diffusive mass transport in the porous diffusion layer 14. To achieve an additional, convective mass transport from the bipolar plate 12 through the porous diffusion layer 14 to the first catalytic reaction layer 16, with a desired more uniform mass transport distribution being formed, it is provided that, in the exemplary embodiment shown in FIG. 1, a pressure difference is generated in two adjacent channels 22, 24. This results in both a diffusive heat and mass transport on account of the temperature and concentration gradients which are present and also a convective heat and mass transport, on account of the pressure gradient which is present between two adjacent channels 22, 24 of the bipolar plate 12.

The sectional illustration of the fuel cell 10 (half-cell) only shows an anode or cathode side, the reaction operations which result there corresponding to one another.

The bipolar plate 12 may have different geometrical configurations in order to be able to fulfill its task of carrying gases (channels 22, 34) and electrons (webs 26) through the porous diffusion layer 14 to the first catalytic reaction layer 16. Bipolar plates having projecting structures and channels are known. If channels are used, these channels may be provided in a meandering form in the bipolar plate 12 or may also form a row of channels through which medium can flow in parallel by using a distributor manifold and a collection manifold. In this case, it is also possible to provide the channels as multiple meanders, in which case a pressure drop between a channel inlet and a channel outlet, which results in the system of channels in the bipolar plate 12, should be kept as low as possible, which is advantageous in particular for relatively large bipolar plates.

Figure 2:
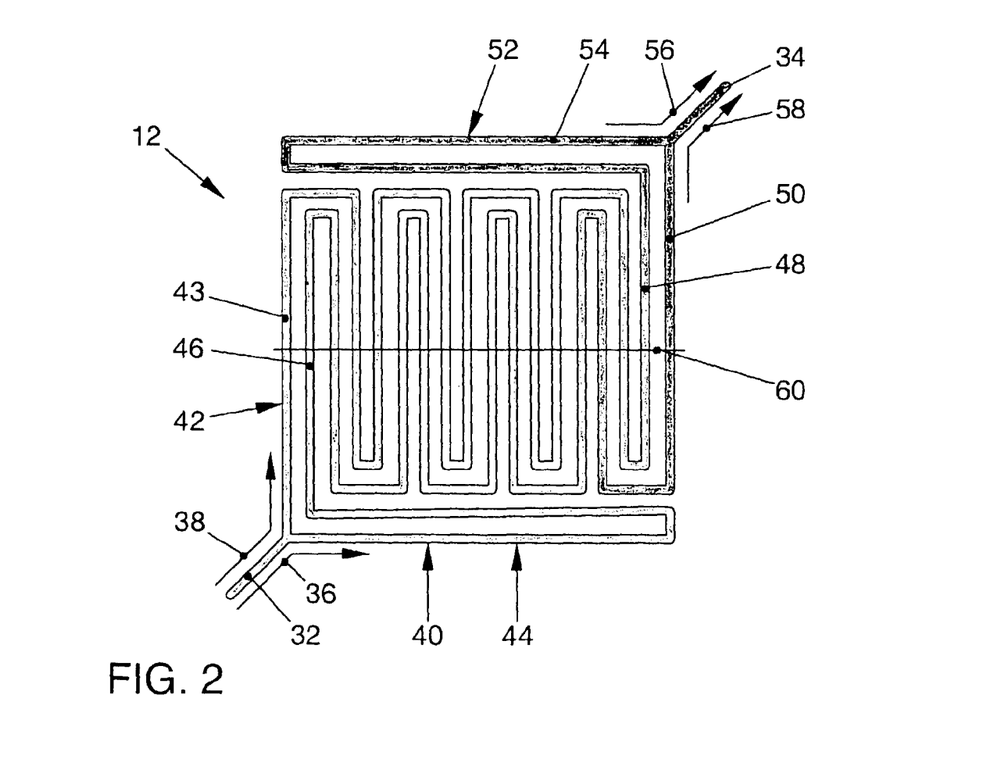
FIG. 2 is a diagrammatic plan view of a system of channels in a bipolar plate of a fuel cell according to the invention.

FIG. 2 shows a diagrammatic plan view of part of the surface 13 of the bipolar element 12 according to one embodiment. The bipolar plate 12 has an operating-medium inlet 32, through which, as indicated by the arrows 36, 38 an operating medium (gaseous reaction products and gaseous reactants) flows into a first channel 40 for carrying an operating medium (first channel) and into a second channel 42 for carrying an operating medium (second channel) of a system of channels at the surface 13 of the bipolar plate 12. The first channel 40 has a first loop 44, which is adjoined by a section 46 of the first channel 40. The section 46 of the first channel 40 extends parallel to a section 43, which is immediately adjacent following the operating-medium inlet 32, of the second channel 42, so that the sections 46, 43 of the two channels 40, 42 form two adjacent channel sections. On account of the additional first loop 44 of the first channel 40 compared to the second channel 42 (additional distance to be flowed through), a desired pressure difference results in the two adjacent channel sections 46, 43. Correspondingly, there is also a pressure difference between further adjacent channel sections (which extend parallel to one another) of the first channel 40 and of the second channel 42 between the operating-medium inlet 32 and an operating-medium outlet 34 of the bipolar plate 12. Immediately upstream of the operating-medium outlet 34 there is a final section 50 of the first channel 40, while the second channel 42 passes through an additional second loop 52, so that it is connected to the operating-medium outlet 34 by section 54. The second loop 52 of the second channel 42 is used to reduce the pressure difference between the respectively adjacent (parallel) sections of the first channel 40 and of the second channel 42 immediately upstream of the operating-medium outlet 34. Therefore, the operating medium is passed from the first channel 40, in the direction indicated by arrow 58, and from the second channel 42, in the direction indicated by arrow 56, into the operating-medium outlet 34 of the bipolar plate 12. The bipolar plate 12 illustrated in FIG. 2 is a system of channels in the form of a double meander; on account of the integration of the additional first loop 44 and of the additional second loop 52 immediately downstream of the operating-medium inlet 32 and immediately upstream of the operating-medium outlet 34, respectively, a new configuration of channels has been created in order to produce a desired pressure difference between in each case two adjacent channel sections such as section 43 and 46 or sections 48 and 50.

FIG. 2 additionally indicates calculated pressure distribution values in the channels of the bipolar plate 12 according to the invention. More specifically, pressure values in the channels increase with increasing darkness of the channels shown in FIG. 2. The pressure values indicated in FIG. 2 have been calculated without simulating or modeling the diffusion layer and the electrochemical reaction. The new type of flow configuration according to the invention, when compared to the flow configurations of the prior art, is characterized in that there is a sufficiently great pressure difference between two adjacent channels in order to improve or form a more uniform heat and mass transport in the diffusion layer of the fuel cell. This is achieved by the fact that one of the two channels (the first channel 40 in FIG. 2) executes an additional loop, and then both channels run as a double meander over the bipolar plate, and then, toward the operating-medium outlet, the other channel (the second channel 42 in FIG. 2) executes a corresponding additional loop, in order to ensure a uniform flow through the bipolar plate. Since the additional loops can advantageously be oriented as desired, this principle can also be applied to multiple meanders with any desired number of channels.

Figure 3:
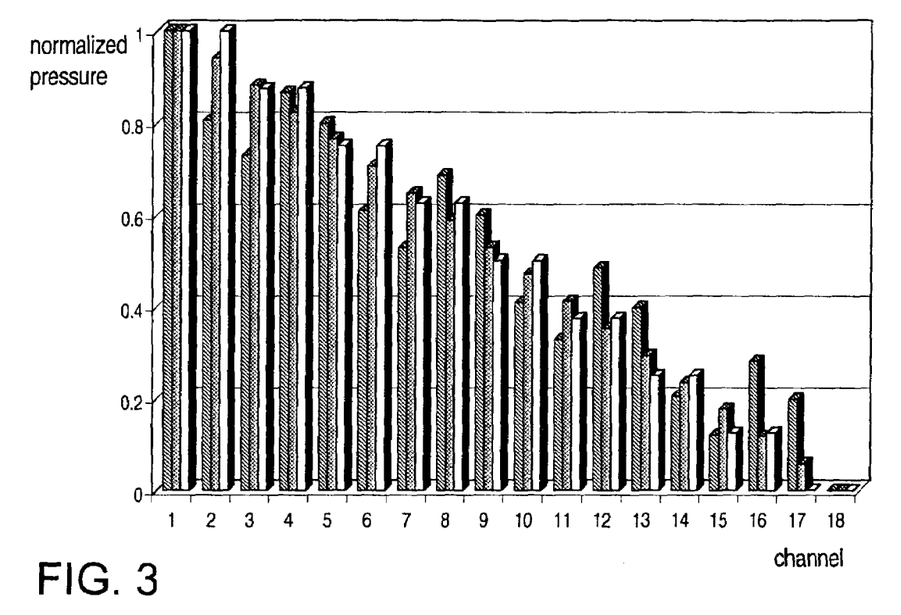
FIG. 3 is a bar chart for illustrating normalized pressure values in the channels of a bipolar plate along a section line.

FIG. 3 shows, in the form of a bar chart, the normalized pressure distribution values in the respective channels for a novel flow configuration according to the invention, along section line 60 in FIG. 2, for a traditional meander (without additional loops) and for a double meander (likewise without additional loop). The normalized pressure values for the novel flow configuration are indicated by diagonally hatched columns, the pressure values for the traditional meander are indicated by crosshatched columns, and the pressure values for the double meander are indicated by columns without hatching. The normalized pressure distribution values between 0 and 1 results from equation (1):

$$p_{norm} = \frac{p - p_{out}}{p_{in} - p_{out}} \quad (1)$$

wherein $p_{norm}$ is the normalized pressure value, p is the pressure at a given point in the flow configuration, $p_{in}$ is the pressure at the inlet of the flow configuration, and $p_{out}$ is the pressure at the outlet of the flow configuration. It can be seen from the bar chart shown in FIG. 3 that with the novel flow configuration according to the invention there is a desired pressure difference between in each case two adjacent channels which is sufficiently great to achieve an improved, i.e. more uniform heat and mass transport in the diffusion layer of a fuel cell. The conventional flow configurations "traditional meander" and "double meander" do not have a pressure difference of this type between two adjacent channels.

Figure 4:
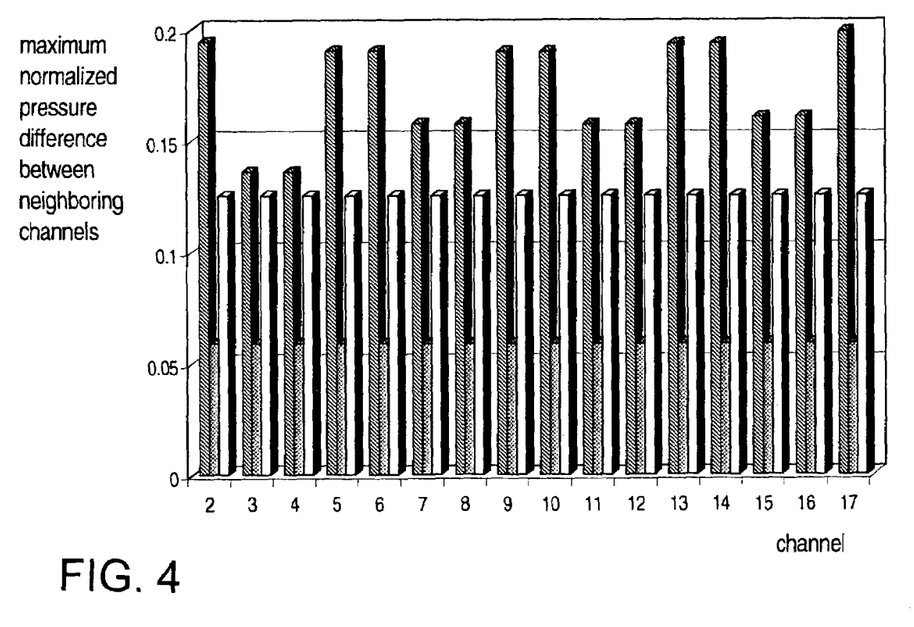
FIG. 4 is a bar chart for illustrating the maximum normalized pressure difference with respect to a respective adjacent channel.

FIG. 4 shows a bar chart illustrating in each case the maximum normalized pressure difference of a channel of the respective flow configuration with respect to its two adjacent channels. The maximum normalized pressure difference values for the novel flow configuration are indicated by diagonally hatched columns, the pressure difference values for the traditional meander are constant and are indicated by crosshatched columns, and the values for the double meander are also constant and are indicated by columns without hatching. It can be seen from FIG. 4 that with the novel flow configuration according to the invention there is always a greater maximum pressure difference than with the two conventional flow configurations. On account of this greater pressure difference, there is an improved convective heat and mass transport in the diffusion layer, so that ultimately a fuel cell system with a higher performance is obtained. The same effect of a greater pressure difference between two adjacent channels also results when using other flow configurations, for example if the channels are disposed as a double spiral, wherein in this case too the desired pressure difference can be produced between two adjacent channels or channel sections.

Alternatively, it is possible for the double spiral to be formed without additional loops. However, multiple spirals with a plurality of additional loops are also possible.

Figure 5:
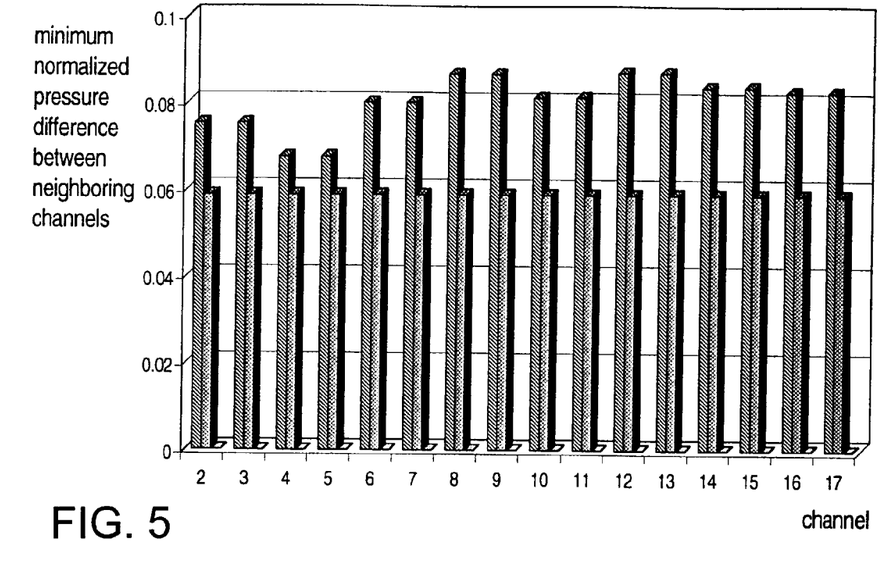
FIG. 5 is a bar chart for illustrating the minimum normalized pressure difference with respect to a respective adjacent channel.

FIG. 5 is a bar chart for illustrating in each case the minimum normalized pressure difference of a channel of a respective flow configuration with respect to its two adjacent channels. The minimum normalized pressure difference values for the novel flow configuration are indicated by diagonally hatched columns, the values for the traditional meander are constant and are indicated by crosshatched columns, and the values for the double meander are zero. In this context, the statements which have been made in connection with FIG. 4 also apply to the illustration shown in FIG. 5.

Figure 6:
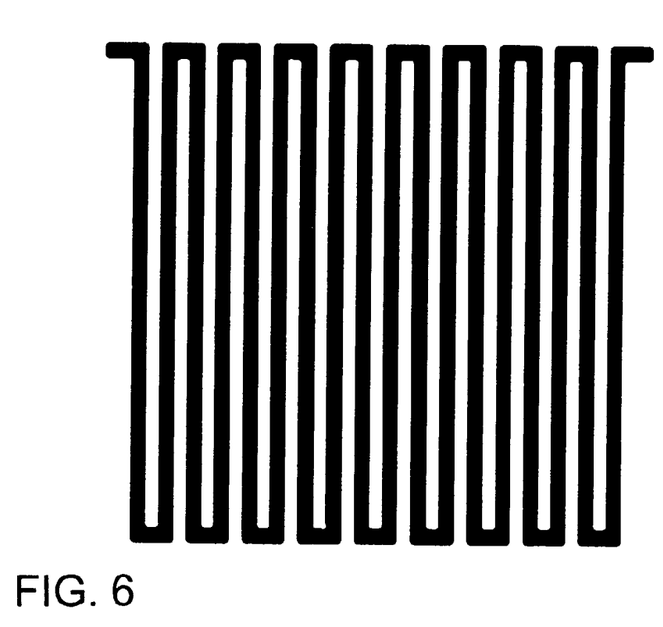
FIG. 6 is a diagrammatic plan view of a system of channels forming a single meander.
Figure 7:
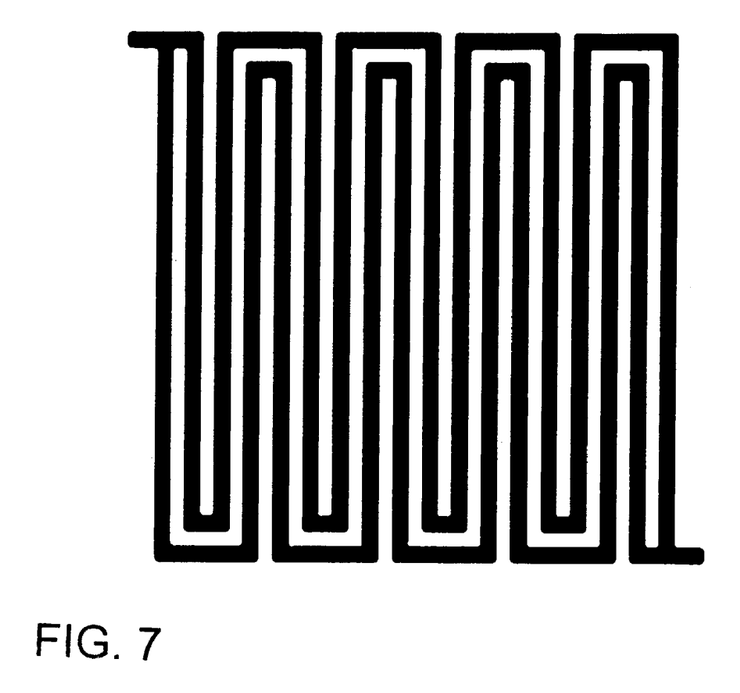
FIG. 7 is a diagrammatic plan view of a system of channels forming a double meander.
Figure 8:
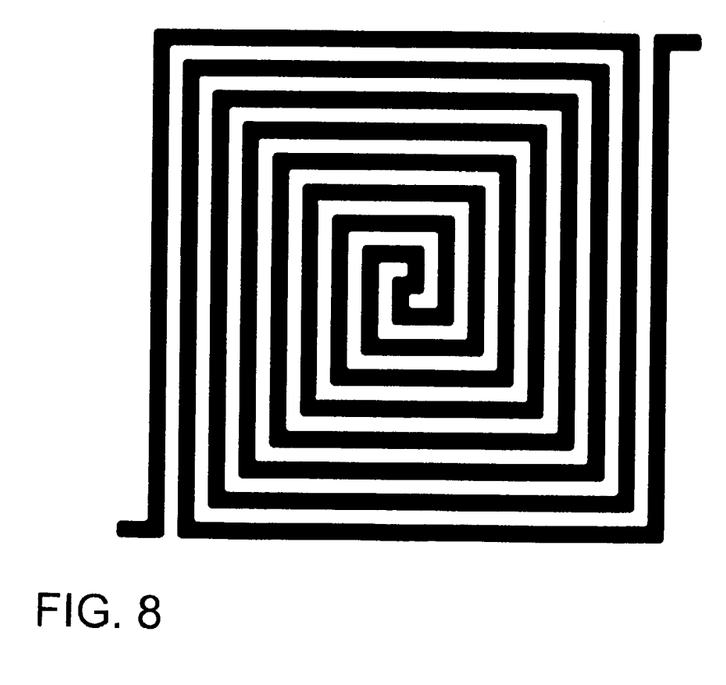
FIG. 8 is a diagrammatic plan view of a system of channels forming a double spiral.
Figure 9:
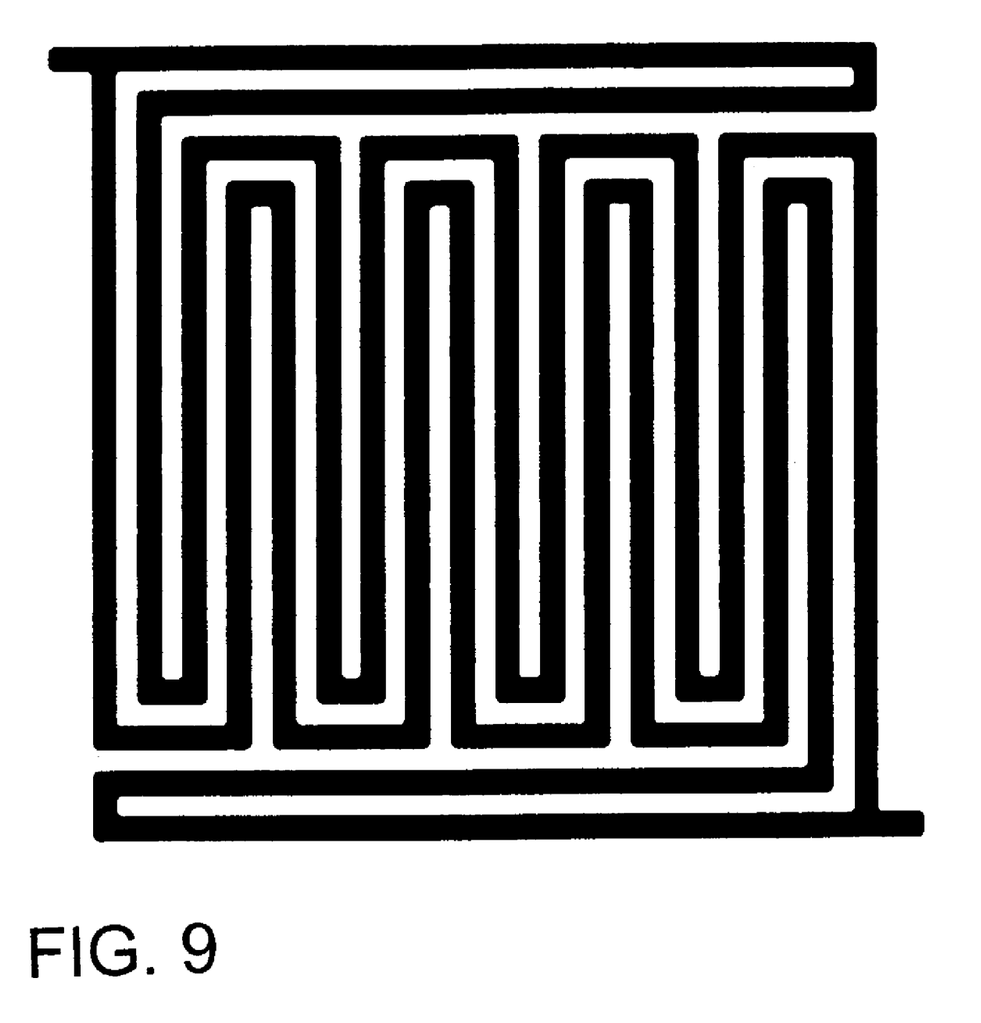
FIG. 9 is a diagrammatic plan view of a system of channels forming a multiple meander.

FIG. 6 is a diagrammatic plan view of a system of channels forming a single meander configuration, FIG. 7 is a plan view of a double meander configuration. FIG. 8 is a diagrammatic plan view of a system of channels forming a double spiral configuration, and FIG. 9 is a diagrammatic plan view of a system of channels forming a multiple meander configuration according to the invention.

We claim:

1. A method for improving a heat and mass transport in a fuel cell, the method which comprises:
    providing a bipolar element including a plurality of channels for carrying an operating medium;
    providing a diffusion layer operatively connected with the bipolar element;
    generating a convective heat and mass transport in the diffusion layer by generating a pressure difference between two adjacent ones of the channels; and
    generating the pressure difference between the two adjacent ones of the channels and simultaneously minimizing a pressure drop between an operating-medium inlet and an operating-medium outlet by providing the channels such that a first section of a first one of the channels forms a loop, and such that further sections of the first one of the channels extend adjacent to sections of a second one of the channels.

2. The method according to claim 1, which comprises using an operating medium including gaseous reaction products and gaseous reactants.

3. The method according to claim 2, which comprises supplying the gaseous reactants as part of a mixture.

4. The method according to claim 2, which comprises supplying the gaseous reactants as pure reactants.

5. The method according to claim 2, which comprises transporting reaction products, reactants, and electrons in the diffusion layer.

6. The method according to claim 1, which comprises transporting $H_2O$ as a reaction product in the diffusion layer.

7. The method according to claim 1, which comprises transporting $H_2$ and $O_2$ as reactants in the diffusion layer.

8. The method according to claim 1, which comprises transporting reactants from the diffusion layer to a catalytic reaction layer.

9. The method according to claim 1, which comprises providing a surface-structured bipolar plate as the bipolar element, the bipolar plate having a surface formed with webs between the channels for carrying the operating medium, the channels being open at the surface of the bipolar plate.

10. The method according to claim 9, which comprises transporting electrons, via the webs, to the diffusion layer.

11. The method according to claim 1, which comprises providing the two adjacent ones of the channels for carrying the operating medium as channels extending continuously from the operating-medium inlet to the operating-medium outlet of the fuel cell.

12. The method according to claim 11, which comprises providing the plurality of channels as a system of channels having adjacent channel sections and extending from the operating-medium inlet to the operating-medium outlet of the fuel cell.

13. The method according to claim 12, which comprises providing the system of channels as a flow configuration selected from the group consisting of a single meander configuration, a multiple meander configuration, and a double spiral configuration.

14. The method according to claim 12, which comprises providing the system of channels such that a first one of the channels for carrying the operating medium forms one of a loop and a meander downstream of the operating-medium inlet, such that sections of the first one of the channels extend substantially parallel to sections of a second one of the channels for carrying the operating medium as far as the operating-medium outlet, and such that the second one of the channels for carrying the operating medium forms one of a loop and a meander upstream of the operating-medium outlet.

15. The method according to claim 14, which comprises providing the substantially parallel extending sections of the first one and of the second one of the channels such that the sections of the first one and of the second one of the channels respectively form one of a single meander and a multiple meander.

16. The method according to claim 14, which comprises providing the one of the loop and the meander of the first one of the channels with a length substantially equal to a length of the one of the loop and the meander of the second one of the channels.

17. The method according to claim 14, which comprises providing the one of the loop and the meander of the first one of the channels with a shape substantially matching a shape of the one of the loop and the meander of the second one of the channels.

18. A fuel cell configuration, comprising:

a diffusion layer;

a bipolar element adjacent said diffusion layer, said bipolar element having a plurality of channels formed therein for carrying an operating medium;

an operating-medium inlet and an operating-medium outlet operatively connected to said plurality of channels; and said plurality of channels including a first channel and a second channel, a first section of said first channel forming a loop and further sections of said first channel extending adjacent to sections of said second channel in order to generate a pressure difference between said first channel and said second channel and to simultaneously minimize a pressure drop between said operating-medium inlet and said operating-medium outlet.

19. The fuel cell configuration according to claim 18, wherein said diffusion layer and said bipolar element form a motor vehicle fuel cell component.

* * * * *